June 21, 1960 W. P. LEAR 2,942,233
FLIGHT INDICATING INSTRUMENT AND SYSTEM FOR AIRCRAFT
Filed June 3, 1955 2 Sheets-Sheet 1
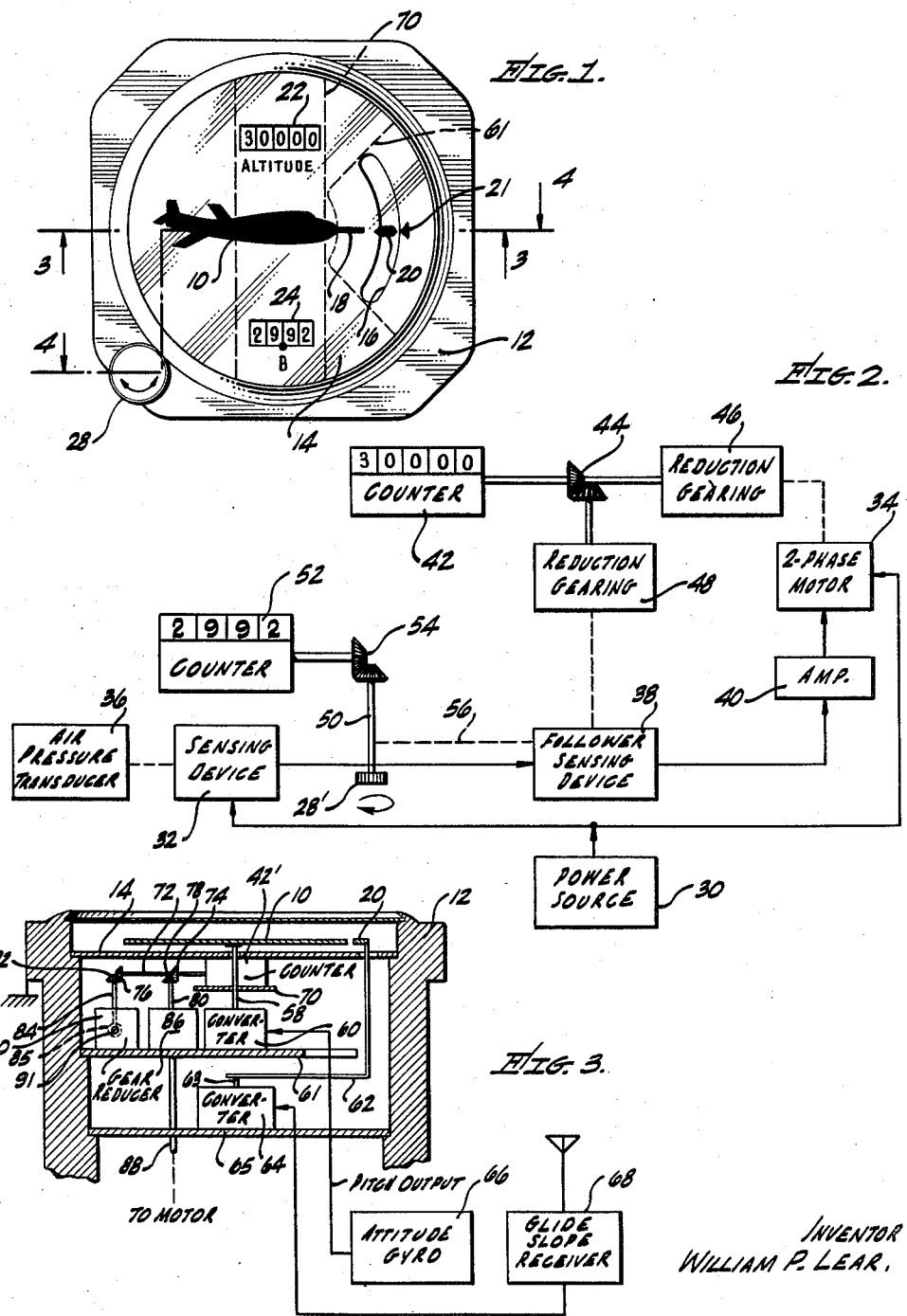
INVENTOR
WILLIAM P. LEAR,
BY
Perry E. Turner
AGENT.

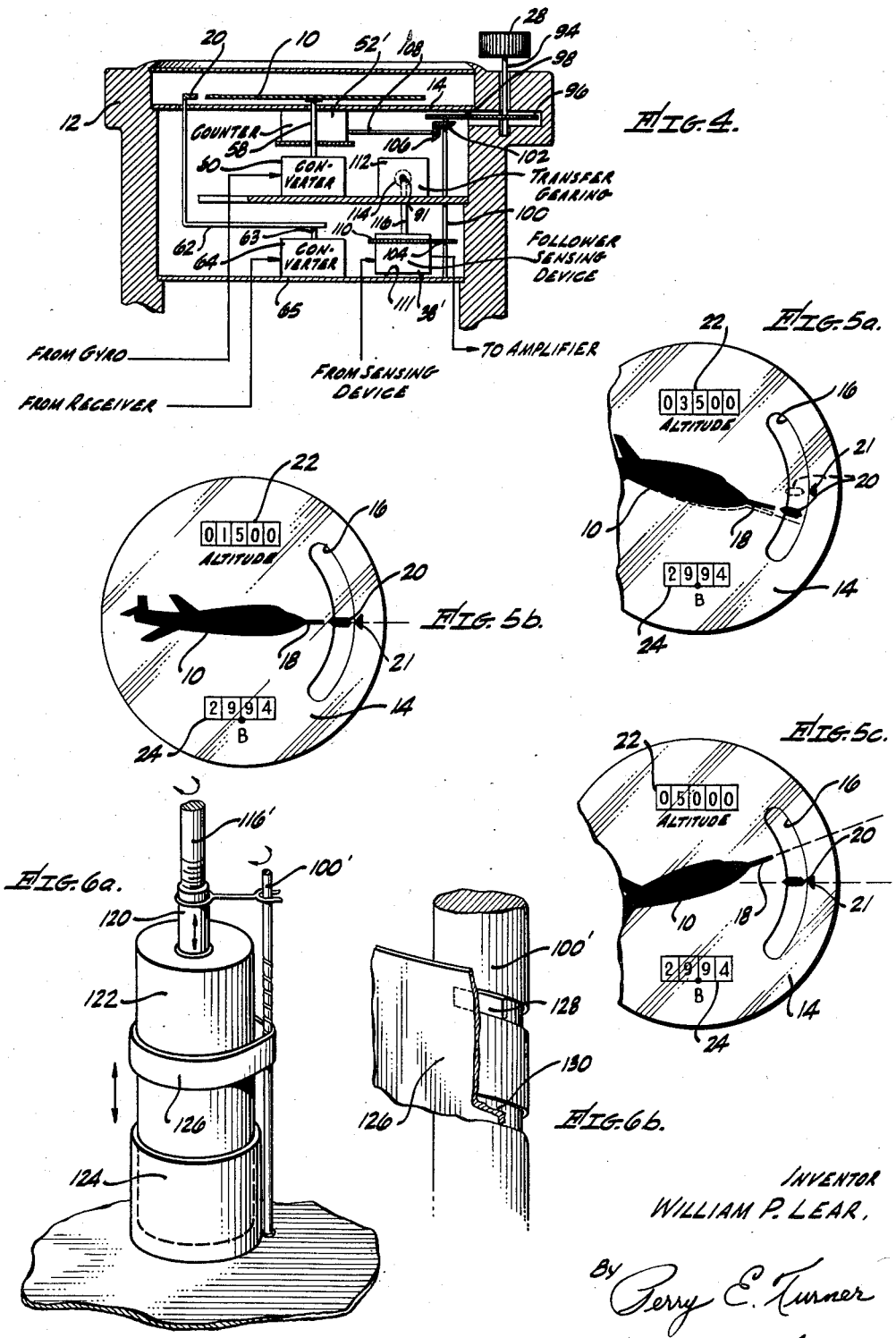

United States Patent Office 2,942,233
Patented June 21, 1960

2,942,233
FLIGHT INDICATING INSTRUMENT AND SYSTEM FOR AIRCRAFT

William P. Lear, Pacific Palisades, Calif., assignor to Lear, Incorporated, Santa Monica, Calif.

Filed June 3, 1955, Ser. No. 513,100

2 Claims. (Cl. 340—27)

This invention relates to instrumentation systems for aircraft, and more particularly to a system and means by which a single instrument provides information concerning altitude and attitude of flight, in normal flight or in landing approaches along a radio glide path or slope.

Heretofore it has been necessary for a pilot to assimilate information from different instruments to determine his altitude and whether his plane is flying in a "nose-up" or "nose-down" attitude. Altitude readings are generally obtained from the positions of a number of pointers respectively indicating hundreds, thousands and tens of thousands of feet of altitude, as is well known. Pitch attitude information is generally obtained by determining the angle between fixed and movable indices, e.g., movement of a member having a graduated scale with reference to a fixed marker. Further, in approaching a landing along a radio glide path, still another instrument must be observed for determining whether the plane is properly following the glide slope. The mental adjustments and calculations required in these situations place stringent demands on the already overburdened pilot, who must concern himself with numerous other tasks during flight.

It is a primary object of this invention to provide an improved system and means for indicating aircraft flight, and with which the requirement for numerous mental calculations is eliminated.

It is another object of this invention to provide a system utilizing a single instrument from which a pilot can tell at a glance the altitude and pitch attitude of his aircraft, and also whether the aircraft is in proper flight along a radio glide path in landing approaches.

It is still another object of this invention to provide an improved system for presenting altitude indications for aircraft wherein such indications are easily read without the necessity for mental translations required with prior art altimeters.

A further object of this invention is to provide an improved system and means for indicating flight of an aircraft, which utilizes component parts of simple design and rugged construction, and which permits the elimination of numerous instruments heretofore required.

The above and other objects and advantages of this invention will become apparent from the following description taken in conjunction with the accompanying drawings, in which preferred embodiments are illustrated by way of example. The scope of the invention is pointed out in the appended claims. In the drawings, Fig. 1 is a plan view of an indicating instrument in accordance with this invention;

Fig. 2 is a schematic diagram to illustrate a portion of the system of this invention for use in conjunction with the instrument of Fig. 1;

Fig. 3 is an elevation view, partly in section, taken along line 3—3 of Fig. 1;

Fig. 4 is an elevation view, partly in section, taken along line 4—4 of Fig. 1;

Figs. 5a, 5b and 5c are partial plan views of a portion of the instrument of Fig. 1 to aid in understanding the operation of this invention;

Fig. 6a is a perspective view showing a modification of a portion of the system of this invention, and Fig. 6b is a perspective view, partly broken away, of the modification shown in Fig. 6a.

Briefly, this invention comprises a digital reading altitude indicator to give direct readings of altitude, a movable silhouette needle controlled to give directly observable indications of the instant pitch attitude of the aircraft, and a movable pointer positionable to represent radio glide slope information. The altimeter readings and the pitch attitude and glide slope indications are all presented on the face of a single instrument. In landing approaches along the glide slope, the pilot has only to maneuver his aircraft to keep the glide slope pointer aligned with a fixed marker, and direct readings of instant altitude are presented to view at all times.

Referring to Fig. 1, a pitch attitude pointer or needle 10, in the shape of the profile or silhouette of an aircraft as seen from the side, is supported in a housing 12 for rotation above a mask 14. The mask is provided with an arcuate cut-out 16 adjacent to the nose or pointer end 18 of needle 10. A glide slope pointer 20 is positioned in cut-out 16 for movement in either direction from the center. A fixed marker 21 is inscribed on mask 14 adjacent the center of cut-out 16. The arrangement of needle 10 and pointer 20 for rotation will be described hereafter in connection with Figs. 3 and 4.

Mask 14 is provided with rectangular windows 22 and 24 on opposite sides of needle 10. The digits of a counter for indicating altitude are observable through window 22, and the digits of a counter for indicating the positioning of the sea level barometric pressure adjustment are viewed through window 24. A control knob 28 is provided for calibrating the altitude reading for various barometric conditions. Means for accomplishing these functions will now be described with reference to Fig. 2.

Referring to Fig. 2, a power source 30 is adapted to supply power to a sensing device and a motor 34. Sensing device 32 may be a conventional self-synchronous device of the type known as a synchro transmitter. Sensing device 32 is mechanically coupled to an air pressure tranducer 36, and its electrical output is applied to a similar sensing device 38, designated as a follower, the output of which is coupled through an amplifier 40 to motor 34. Follower 38 may be a synchro control transformer. In the use of conventional synchros, the rotor of sensing device 32 would be mechanically coupled to transducer 36 and the rotor winding electrically coupled to power source 30; the rotor winding of follower sensing devices 32 and 38 directly connected to provide the output-input connections between them.

A digital indicator or counter 42 of the conventional type employing reversible Geneva or similar movements has its input shaft coupled through reduction gearing 46 to the motor 34. Gears 44 are also provided to couple the output of reduction gearing 46 through similar reduction gearing 48 to the rotor of follower 38. A control knob 28' has its shaft 50 coupled to the input shaft of a counter 52 through gears 54, and shaft 50 is also mechanically coupled to the housing of follower 38 as indicated at 56. Counter 52 is similar to counter 42.

The rotors of sensing devices 32 and 38 preferably are limited to less than a single revolution. Thus, transducer 36 is adapted to rotate the rotor of sensing device 32 in one direction from an initial position at ground level to a maximum of less than 360° at high altitude. Coincident with changes in altitude, and hence changes in instant air pressure, the rotor of sensing device 32 applies a signal to follower 38, and an electrical error signal representative of the misalignment of the rotors of both sensing devices 32, 38 is fed through amplifier 40 to the control winding of motor 34.

The magnitude of this error signal represents the degree of misalignment of the two rotors and the phase of the error signal depends upon the direction of the misalignment. This results in a rotation of the input shaft of counter 42 and the rotor of follower 38 corresponding to the error signal, whereupon the rotor of follower 38 is turned sufficiently to reduce the misalignment to zero. Further, the reading presented by counter 42 in response to the rotation of its input shaft indicates the altitude corresponding to the instant pressure.

Errors resulting from non-correspondence between the barometric pressure and altitude, as may be due to climatic variations, are compensated by rotation of the input shaft of counter 42 to a position corresponding to the instant sea level barometric pressure of the region. This causes the stator of follower 38 to assume a position relative to its rotor which is a function of the barometric pressure. It will be apparent that this arrangement is substantially the same as a differential gearing arrangement interconnected between the rotor of follower 38, reductioin gear 48, and shaft 50 of the control knob. Thus, control of motor 34, and hence of the input shaft of counter 42 and the rotor of follower 38, corresponds to the instant air pressure correlated with the barometric pressure at sea level, whereby counter 42 presents readings of barometric altitude, i.e., altitude corresponding to standardized pressure/altitude equivalents.

A practical arrangement for incorporating the system of Fig. 2 in the instrument of Fig. 1 is illustrated in Figs. 3 and 4, to which reference will now be made along with Figs. 1 and 2. Silhouette needle 10 is mounted on a shaft 58 which is rotatably supported by a converter 60 secured to an upper platform 61. Glide slope pointer 20 is fixed to an L-shaped member 62 which is mounted on a rotatable shaft 63 preferably aligned on the same axis with shaft 58. A converter 64 mounted on a lower platform 65 supports shaft 63 for rotation. Signals from an attitude gyroscope 66 representing the attitude of the aircraft with respect to the pitch axis of such gyroscope are applied to converter 60, and signals from a glide slope receiver 68 are applied to converter 64, as shown schematically in Figs. 3 and 4. An altitude counter 42' is mounted on a narrow platform 70 which is located above platform 61. The input shaft 72 of counter 42' is provided with spaced bevel gears 74, 76. A right angle turn from gear 74 is made with a similar bevel gear 78 fixed to the upper end of a shaft 80, and a similar right angle turn from gear 76 is provided by a gear 82 fixed to the upper end of shaft 84. Shaft 80 is the output shaft from a gear reducer 86 which is mounted on platform 61 and adapted to be coupled to a motor through its input shaft 88. Shaft 84 is mechanically coupled, as by gearing generally indicated at 85, to a gear reducer 90 mounted on platform 61. In practice, the instrument would be mounted horizontally, in which case platform 70 would be forward of platform 61, and platform 65 would be located to the rear of platform 61.

Control knob 28 (Fig. 4) is mounted on a shaft which is rotatably supported in housing 12. A gear 96 fixed to shaft 94 engages a gear 98 fixed to the upper end of a rotatable shaft 100 which projects through platform 61 from platform 65. Additional gears 102 and 104 are provided on shaft 100. Gear 102 is a bevel gear and a right angle turn is made with a bevel gear 106 fixed to the input shaft 108 of a counter 52' that is mounted on platform 70. Gear 104 meshes with a large gear 110 which is fixed to the housing or frame of a follower sensing device 38', which is mounted for rotation on a suitable support 111 fixed to platform 65. The shaft 91 from gear reducer 90 (Fig. 3) is coupled to transfer gearing 112 (Fig. 4) from which a right angle turn may be made through output gearing, as indicated at 114, to effect a shaft connection 116 to the rotor of follower 38'.

In order for shaft 116 to be rotated to cause the rotor of follower 38' to follow the movement of the rotor of the sensing device, it is apparent that the reduction ratio of gear reducer 86, in converting motor shaft rotation to counter shaft rotation, is designed to take into account the motor speed and the maximum rate of change of altitude; similarly, gear reducer 90 which converts the counter shaft position to follower shaft position is designed for the total range of the instrument.

The operation of the digital altimeter, pitch attitude indicating needle 10 and glide slope pointer 20 will now be described with reference to Fig. 5 along with Figs. 1–4. Prior to flight, and as previously indicated, the altimeter must be conditioned for operation in conformity with the existing barometric pressure at sea level. This may be accomplished by turning control knob 28 until the digits of counter 52' present the existing barometric pressure to view through window 24. In the example shown in Fig. 1, the existing barometric pressure at sea level may be 29.92 inches of mercury. In this position of the elements of counter 52' and the input shaft 108 of counter 52', gear 104 will have effected the positioning of gear 110, and hence the housing of follower 38', relative to the shaft 116 and rotor of follower 38', in accordance with the barometer reading. When the aircraft is in flight and has been levelled off at an altitude of, for example, 30,000', the altimeter will have operated in the manner previously described to present the correct barometric altitude reading to view, as in Fig. 1.

During ordinary flight, the glide slope receiver is inoperative and glide slope pointer 20 will assume a neutral position. Preferably, converter 65 is adapted in the absence of input signals to cause the glide slope pointer to be positioned in the center of cut-out 16 and aligned with marker 21, as illustrated in Fig. 1. Under such conditions of flight, the instrument of this invention is a combined altimeter and pitch attitude indicator. If it is desired to remain in level flight, the pilot has only to keep the nose 18 of needle 10 aligned with marker 21. If it is desired to remain at constant altitude, it is necessary only to fly the aircraft to maintain a constant reading in window 22.

In preparation for a landing, control knob 28 may be manipulated to cause the local sea level barometric reading to be shown in window 24, e.g., 29.94 inches of mercury, which conditions the digital altimeter for correct operation in the area. Operation of the glide slope receiver causes converter 64 to rotate shaft 63 and pointer 20 in the direction in which the pitch attitude of the aircraft should be changed in order to get on the beam. The plane will be made to fly the beam upon its pitch attitude being changed until a null signal occurs in the output of the receiver. Pointer 20 moves back to marker 21 as the signals decrease and is aligned with marker 21 at the null as indicated in dotted lines in Fig. 5b. Thereafter the pilot need only fly the aircraft to keep pointer 20 aligned with the marker 21 in order to stay on the glide slope. Any pitch deviation of the aircraft which causes it to fly above or below the glide path will be reflected by a deviation of pointer 20 from alignment with marker 21. This condition is corrected by changing the attitude of the aircraft until pointer 20 is aligned again with marker 21. Upon landing, the altitude reading will show the altitude of the landing strip (1500' in the illustrated case), as indicated in Fig. 5b.

It is possible to make an instrument approach using needle 10 and pointer 20 as a matched pointer deviation indicator. This can be accomplished by making converter 64 suitably sensitive about the null so that pointer 20 will be deflected to a position with respect to marker 21 which corresponds to a nominal glide slope angle, i.e., a glide path with a tolerable deviation from the center of the radio beam. This position may be as illustrated by the solid pointer 20 in Fig. 5a. By maneuvering the aircraft to keep the nose of needle 10 aligned with pointer 20, satisfactory instrument approach can be made.

When the aircraft is being flown from a lower to a higher altitude (see Fig. 5c), the pilot can compare the position of needle 10 with respect to pointer 20 in the center of cut-out 16 to ascertain the attitude of his aircraft in approaching the new altitude, and the changing altitude readings in window 22 can be observed to determine how rapidly the new altitude is being approached. When the aircraft is nearing the desired new altitude, the pilot may begin to level off slowly until needle 10 indicates the correct attitude for constant attitude flight.

An alternative sensing device and associated parts which may be used for the synchros previously described is shown in Figs. 6a and 6b, in which parts corresponding to those previously described are indicated by prime members. The alternative sensing device comprises a differential transformer in which a rod or slug 120 is adapted for longitudinal movement through the center of its housing 122. In the instrument, housing 122 is slidably supported at its lower end in a concentric cup 124 mounted on platform 65. Rod 120 threadedly engages shaft 116' corresponding to the shaft connection 116 of Fig. 4. Shaft 100' is mounted for rotation at its lower end in a bearing provided in platform 65. Shaft 100' is provided with external threads, and a strap 126 fixed to housing 122 is internally threaded, as illustrated by projections 128, 130, to engage shaft 100'. When shaft 100' is rotated, strap 126 rides along the threads in shaft 100 to cause housing 122 to be moved longitudinally with respect to rod 120. Rotation of shaft 116' causes rod 120 to be moved longitudinally with respect to housing 122. A spacer element may be fixed at one end to rod 120 and adapted at its opposite end to slidably engage shaft 100' to prevent rotation of rod 120 with shaft 116'. Rotation of shaft 100' is permitted in such an arrangement, whereas rod 120 is prevented from rotating and restricted to longitudinal movement only.

The above described arrangement permits rotary motion of shafts 116' and 100' to be converted into linear motion of rod 120 and housing 122. The results are the same as obtained with the synchro previously mentioned. Further, it will be apparent that both sensing devices must be of the same type, i.e., both synchros or both differential transformers.

The above described digital altimeter arrangement provides a single speed data transmission link. However, it will be apparent that the sensing devices could be arranged so the system constitutes a two-speed data transmission link without departing from the scope of this invention.

A conventional alarm flag (not shown) may be utilized to warn the pilot of malfunctioning of the equipment. To this end, a converter for controlling the alarm flag may be positioned within the housing and coupled to suitable portions of the signal generating devices. While these devices are operating properly, the flag is maintained in a first position where it is hidden from view. When either of the devices fails, the converter permits the flag to move to a second position where it can be viewed, as through an opening suitably located in the mask. In this manner, the pilot would be presented with a visual warning immediately upon failure of either of these devices and made aware that he should not rely on the instrument indicators.

It will be apparent from the foregoing that a novel indicating instrument and system for aircraft is provided in which pitch attitude information, glide slope information and altitude information are all present on the face of a single instrument, by means of which mental calculations by a pilot are maintained at a minimum and resort to a variety of instruments to obtain this information is made unnecessary.

What is claimed is:

1. A combined indicating instrument system for aircraft equipped with a radio glide slope receiver to provide signals representing the deviation of the aircraft from the glide path to be followed in landing approaches, said instrument system comprising a housing, a mask in one end of said housing, a shaft extending through said mask from the interior of said housing, a needle in the shape of the profile of the aircraft fixed to the outer end of said shaft, said needle having an elongated nose pointer to represent the nose of the aircraft, said mask having a first opening adjacent its periphery, means coupled to said shaft for orienting said shaft and needle in coincidence with the pitch attitude of the aircraft, said mask having a marker inscribed thereon adjacent said opening, a movable glide slope indicator positioned in said first opening and means responsive to signals from the glide slope receiver to move said glide slope indicator to a position with respect to said marker which corresponds to the magnitude of said signals, and said indicator and nose pointer being aligned with the inscribed marker when the aircraft is in level flight.

2. In an aircraft having a receiver to develop signals representing a glide slope, the combination of an instrument housing, a needle providing a visible outline of an aircraft as seen from the side, said needle being located in one end of said housing, a glide slope pointer, said needle and said pointer being adapted for individual rotation about a common axis, a first signal converter coupled to said pointer for orienting said pointer in response to signals from the receiver, said first signal converter holding said pointer in a neutral position in the absence of received signals, means to develop signals representing the pitch attitude of the aircraft, a second signal converter coupled to said needle, said second signal converter orienting said needle in synchronism with the pitch attitude signals, and said needle being aligned with said pointer in the neutral position when the aircraft is in level flight.

References Cited in the file of this patent
UNITED STATES PATENTS

| | | |
|---|---|---|
| 2,134,132 | Koster | Oct. 25, 1938 |
| 2,467,412 | Wathen | Apr. 19, 1949 |
| 2,538,843 | McGuire | Jan. 23, 1951 |
| 2,582,796 | Reid | Jan. 15, 1952 |

FOREIGN PATENTS

| | | |
|---|---|---|
| 691,029 | Great Britain | May 6, 1953 |